MORSE & LEWIS.

Air Distributor for Chambers of Combustion.

No. 121. Reissued July 18, 1848.

UNITED STATES PATENT OFFICE.

LABAN MORSE AND W. T. LEWIS, OF ATHOL, MASS.; SAID LEWIS ASSIGNOR TO SUMNER R. MORSE AND CUSHING B. MORSE, OF SAME PLACE.

IMPROVEMENT IN AIR-DISTRIBUTERS FOR CHAMBERS OF COMBUSTION.

Specification forming part of Letters Patent No. 4,522, dated May 16, 1846; Reissue No. 121, dated July 18, 1848.

*To all whom it may concern:*

Whereas Letters Patent of the United States of America, bearing date the 16th day of May, of the year 1846, were granted on an Improvement in Stoves or Chambers of Combustion for Burning Fine Fuel, and to LABAN MORSE and WHITMAN T. LEWIS (of Athol, in the State of Massachusetts) and their legal representatives; and whereas the said WHITMAN T. LEWIS afterward—to wit, on the 6th day of June, of the year 1846, by his deed of that date, now recorded in the Books of Transfers of Patent Rights of the United States Patent Office, at Washington, in the District of Columbia—did grant, sell, assign, and transfer to SUMNER R. MORSE and CUSHING B. MORSE, both of Athol, aforesaid, all his (the said Lewis's) right, title, and interest whatsoever in and to the said Letters Patent, whereby the said SUMNER R. MORSE and CUSHING B. MORSE became joint owners with LABAN MORSE of the entire right and title to the said patent; and whereas it has since been and now is believed by the said parties last named as proprietors of the said patent that the said Letters Patent are insufficient to protect them in the full enjoyment of the invention as made and contemplated by the said patentees, Now, therefore, know all men by these presents, that we, the said LABAN MORSE, SUMNER R. MORSE, and CUSHING B. MORSE, all of Athol, in the State of Massachusetts, joint owners of the said patent, (the said LABAN MORSE being the owner of one undivided half of the same, and the said SUMNER R. and CUSHING B. MORSE being each the owner of one undivided fourth part of it,) having surrendered the same to be reissued according to law, on an amended or sufficient specification and claim, do hereby present the following description and accompanying drawings as a clear and exact specification of the nature and principle of the invention of the said LABAN MORSE and WHITMAN T. LEWIS.

The said invention is described and exhibited in the said specification as applied to a chamber of combustion, usually termed a "stove," for heating apartments. It, however, may be applied to and used in many other chambers of combustion, it being employed therein in a like manner and for a like purpose.

Figure 1:
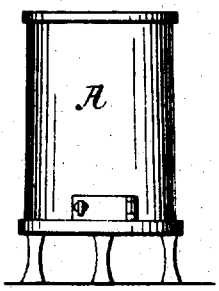
Figure 2:
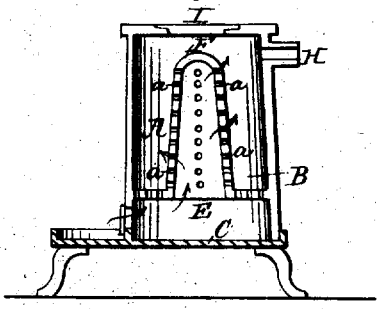
Figure 3:
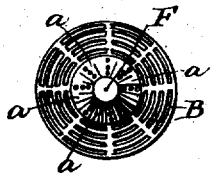
Figure 4:
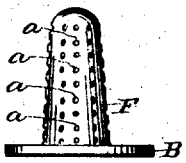

Of the said drawings, Figure 1 represents a front elevation of a stove having the said improvement applied to its chamber of combustion. Fig. 2 is a central vertical and longitudinal section of it. Fig. 3 denotes a top view, and Fig. 4 a side view, of the air-distributer, to be hereinafter explained.

The body A or chamber of combustion of the stove is in form a plain hollow cylinder or truncated cone; or it may have any other desirable shape. It has a grate, B, an ash-pit, C, one or more air-entrances, one or more exit flues or passages, H, and one or more supply-passages and doors thereto. In these respects it does not differ from any common stoves or furnaces for the combustion of fuel. Its grate B, however, has a circular or other proper-shaped opening, E, formed vertically through it at or near its middle part, the said opening being made to communicate with the air-distributer F, placed over it and upon the grate, as seen in the drawings. The said air-distributer may be a hollow cone, conic frustum, cylinder, cube, parallelopiped, pyramid, or pyramidal frustum; and it may be made of steatite, cast-iron, or any other suitable material. It is arranged within the chamber of combustion and upon the fire-grate, and so as to extend up into the said chamber, as seen in Fig. 2. The whole or any suitable portion of the sides of the said distributer is to be perforated with holes or orifices, as seen at *a a*, &c., in Fig. 2, the said holes or orifices being made in such number and positions as circumstances may require, each of them constituting a passage through which air may be suffered to pass from the internal space or part of the distributer and into the chamber of combustion or fuel therein, substantially as denoted by arrows in Fig. 2.

When the chamber of combustion is to be charged with sawdust, tan, or other fine or comminuated fuel, the said fuel is to be thrown or introduced into it (the said chamber) in such manner as to entirely or partially surround the air-distributer, and to fill as high or nearly as high as the lower part of the discharge-flue H, the space existing between the distributer and the surrounding sides of the chamber of combustion. On setting fire to the upper part or top surface of the fuel, air will pass from the internal part of the distributer through the holes *a a*, &c., nearest to the flame and to the fuel in combustion, and supply it with oxygen. The fire will shortly extend downward through the entire mass of fuel, and as it descends will be supplied with air through the holes *a a*, &c., each of which will permit a jet of air to pass through it in a lateral direction and into the fire. By means of the said air-distributer, sawdust, tan, fine coal, or various other kinds of comminuated combustible matters which could not otherwise be burned to advantage may be employed and burned with great ease, and often at a great saving of expense in comparison to what it would cost to make use of many other varieties of fuel. In saw-mills, tanneries, or various other places where such fine fuel is to be had, and where it has been customary to resort to other kinds of combustible matters in order to generate heat in a chamber of combustion, whether said chamber belong to a stove or furnace, the aforedescribed improvement may often be used to great advantage.

It is not intended that the said invention shall be limited to the employment of only one air-distributer in any chamber of combustion, as two or any greater number of the same may be used, the mere duplication, triplication, or increase of the number of said air-distributers being simply a matter of extension of the invention above described, and one to which the inventors thereof are fully entitled by law.

What is claimed as new is—

The air-distributer F, constructed and combined with a chamber of combustion, and used substantially in the manner and for the purpose as hereinabove specified.

In testimony whereof we, LABAN MORSE, one of the original joint inventors, and SUMNER R. MORSE and CUSHING B. MORSE, the assignees of WHITMAN T. LEWIS, the other joint inventor of the above-recited improvement, have hereto set our signatures this 3d day of July, A. D. 1848.

LABAN MORSE.
SUMNER R. MORSE.
CUSHING B. MORSE.

Witnesses:
WM. R. DESPEAU,
ISAAC STEVENS.